United States Patent
Nolet

[19]

[11] Patent Number: 6,158,542
[45] Date of Patent: Dec. 12, 2000

[54] MOTOR-ASSISTED VEHICLE

[76] Inventor: Leopold L. Nolet, 1371 Rougemount Dr., Pickering, Ontario, Canada, L1V 1N2

[21] Appl. No.: 08/937,734

[22] Filed: Sep. 25, 1997

[51] Int. Cl.⁷ .............. B62L 1/02; B62K 11/00; B62M 23/02
[52] U.S. Cl. .......... 180/206; 180/216; 188/24.12
[58] Field of Search ...................... 180/210, 205, 180/206, 216; 280/261, 282; 188/19, 20, 24.11, 24.12, 24.21, 2 D

[56] References Cited

U.S. PATENT DOCUMENTS

| | | | |
|---|---|---|---|
| 778,124 | 12/1904 | Flewelling | 188/19 |
| 3,598,195 | 8/1971 | Steller | 180/27 |
| 3,713,502 | 1/1973 | Delaney et al. | 180/27 |
| 3,759,339 | 9/1973 | Farrow | 180/27 |
| 3,827,519 | 8/1974 | Snider | 180/25 R |
| 4,111,274 | 9/1978 | King et al. | 180/25 R |
| 4,182,194 | 1/1980 | Tomozawa | 74/217 B |
| 4,183,418 | 1/1980 | Dudas | 180/216 |
| 4,226,310 | 10/1980 | Ozaki | 192/6 R |
| 4,313,517 | 2/1982 | Pivar | 180/216 |
| 5,005,674 | 4/1991 | Piatt | 188/24.11 |
| 5,830,096 | 11/1998 | Schmidt et al. | 474/156 |

*Primary Examiner*—J. J. Swann
*Assistant Examiner*—Christopher Bottorff

[57] ABSTRACT

A motor-assisted pedal tricycle has two parallel rear wheels mounted on corresponding first and second axially-aligned axles via overriding clutches. The axially-aligned axles are connected to a differential which is driven by an electric motor, and which allows the first and second wheels to rotate independently of one another. Power may also be applied to one of the rear wheels via a pedal mechanism, which is connected to the wheel via an overriding clutch. The tricycle may be operated using pedal power and motor power independently or in combination. Moreover, the rear wheels may rotate in a forward direction independently of the differential, the motor, and the pedals when the motor and the pedals are not in use, or when the vehicle is travelling at a speed faster than that which can be attained under power of the motor and the pedals either independently or in combination.

16 Claims, 3 Drawing Sheets

MOTOR-ASSISTED VEHICLE

FIELD OF THE INVENTION

This invention relates to a motor-assisted pedal vehicle, and in particular, to a tricycle which may move under power alone or under motor power alone or under both pedal and motor power.

BACKGROUND OF THE INVENTION

Pedal vehicles such as bicycles and tricycles provide an environmentally-friendly mode of transportation for short-distance commuters and have health benefits for users. In addition, use of such vehicles is not governed by the strict laws that apply to cars and motorcycles, rendering them usable by almost all members of the public. Tricycles have an advantage over bicycles in their inherent stability, and they are thus easier to operate by, for instance, the elderly and persons with disabilities. Moreover, tricycles may be adapted to carry considerable loads, further enhancing their utility.

For many individuals, the use of pedal vehicles is restricted to travelling short distances and/or routes without any substantial hills, because of the human energy required to power the vehicles. This is particularly true for tricycles, which are typically heavier than bicycles, and which may be carrying heavy loads. To extend the use of pedal tricycles to a wider range of situations and users, there have been numerous proposals for the provision of a motor to power, to varying degrees, the tricycle.

For example, U.S. Pat. No. 4,313,517 discloses a three-wheeled electric vehicle that can be powered by motor power or pedal power. The construction of this tricycle is such that the pedals are provided for emergency power for use when, for example, the batteries supplying power to the electric motor are discharged. The pedals are therefore not intended to be used to power the tricycle to any great extent.

A tricycle described in U.S. Pat. No. 4,183,418 employs an electric motor to drive the rear wheels via a slip clutch, as well as pedals, such that either or both may be used to power the vehicle. However, the patent does not teach the use of a clutch or ratchet in the pedal drive mechanism, suggesting that the pedals will always spin when the tricycle is in motion.

U.S. Pat. No. 4,111,274 teaches a tricycle having an electric motor directly linked to one rear wheel, and pedal power linked to the other rear wheel via a coaster brake assembly. Thus, although the pedals and motor may be used individually or simultaneously, the absence of a clutch between the motor and its associated rear wheel will cause the motor and its corresponding drive components to be driven during pedalling.

U.S. Pat. Nos. 3,827,519 and 3,759,339 each relate to a pedal/electric motor powered tricycle in which motor power may be engaged to the rear wheels through a clutch. While simultaneous use of both pedal and motor power is possible, there is no provision for releasing the connection between the rear wheels and the motor when the motor is on and the pedals are driving the tricycle faster than that which can be attained by the motor. In this case, the pedal power would disadvantageously also be turning the motor.

Finally, U.S. Pat. No. 3,598,195 describes a tricycle powered by electric motor and/or pedals, wherein the disadvantages of the tricycles discussed above are overcome by providing a ratchet between a differential on the rear axle and each of the two power sources. Nevertheless, this tricycle has a disadvantage in that coasting is inefficient because rotation of the rear wheels causes the differential to be driven. This disadvantage is also present in the above-described prior art tricycles which lack a clutch between the rear axle and the differential and/or motor.

SUMMARY OF THE INVENTION

In view of the above, it is an object of the invention to provide a motor-assisted vehicle, such as a tricycle, wherein either pedal power, motor power, or a combination of the pedal power and motor power may be used to efficiently propel the vehicle, wherein use of either one of the power sources alone is completely independent of the other, and wherein the vehicle may coast without involvement of either of the pedal or motor mechanisms.

A motor-assisted pedal vehicle according to the invention comprises: first wheel means rotationally disposed at one end of the frame and mounted for pivotal movement: with respect to the frame; second wheel means rotationally disposed at a second end of the frame opposite to the first end; wherein the second wheel means comprises first and second wheels in a parallel spaced arrangement such that they have a substantially common rotational axis defined by corresponding first and second axially-aligned axles; first and second overriding clutches disposed between said first and second wheels and their corresponding axles; a differential for connecting the two axially-aligned axles so as to allow the first and second wheels to rotate independently of one another; pedal means mounted on the frame between the first and second wheel means for supplying pedal power to the first wheel; a third overriding clutch disposed between the pedal means and said first wheel; a motor for supplying motor power to the second wheel means via the differential; and, control means for controlling the motor; wherein the vehicle may be operated using pedal power or motor power independently, or using a combination of pedal and motor power; and wherein the first and second wheels may rotate in a forward direction independently of the differential, the motor, and the pedals when the motor and the pedals are not in use, or when the vehicle is travelling at a speed faster than that which can be attained under power of the motor and the pedals either independently or in combination.

In a simplified embodiment of the invention, the pedal means comprises: a pair of crank arms and pedals associated with at least one chainring means; sprocket means mounted on the first axially-aligned axle via the third overriding clutch, the sprocket means being in alignment with the chainring; and a chain meshed with the chainring and the sprocket means.

In a preferred embodiment of the invention the pedal means comprises: a pair of crank arms and pedals associated with at least one chainring means; sprocket means rotationally mounted on the frame between the chainring means and the axially-aligned axles, the sprocket means being in alignment with the chainring means; a first chain meshed with the chainring means and the sprocket means; a first sprocket rotationally mounted on the frame via said third overriding clutch, the first sprocket having an axis of rotation coaxial with the sprocket means such that the first sprocket is driven by the sprocket means; a second sprocket fixed to said first axle and in alignment with thus first sprocket; and a second chain meshed with the first and second sprockets.

According to a preferred embodiment, the sprocket means, the first sprocket, and third overriding clutch are mounted on an axle which is substantially parallel to the axially-aligned axles.

It is also preferable that the sprocket means comprises a series of at least two sprockets of different size, concentrically arranged, a derailleur mounted on the frame adjacent to the sprocket means so as to facilitate movement of the chain meshed thereon from one sprocket to another within the series of sprockets, and control means for controlling the derailleur.

Similarly, it is preferable that the chainring means comprises a series of at least two chainrings of different size, concentrically arranged, a derailleur mounted on the frame adjacent to the chainring means so as to facilitate movement of the chain meshed thereon from one chainring to another within the series of chainrings, and control means for controlling the derailleur.

A vehicle according to the invention is also provided with a brake means associated with the second wheel means for slowing and stopping the vehicle. The brake means comprises first and second brakes, a brake actuating lever, and a brake shaft. The first and second brakes are each mounted on the frame of the vehicle adjacent a rim of a respective wheel of the second wheel means. Each brake has a pair of hinged arms and an actuator cable for causing an end of each arm to move against an opposite side of the respective rim. The brake actuating lever exerts a pull on a brake cable. The brake shaft is rotatably mounted on the frame so as to extend generally parallel to a rotational axis of the wheels of the second wheel means. The brake shaft has fixed thereto a pair of radially-extending first members and a radially-extending second member positioned intermediate of the first members. Each first member is positioned adjacent to a respective one of the first and second brakes. Each actuator cable is connected to an outer radial position on a respective one of the first members. The brake cable is connected to an outer radial position on the second member. Pressing the brake actuating lever results in rotation of the brake shaft and in the arms of the first and second brakes being pressed against the respective wheel rims of the second wheel means to stop the vehicle.

Each of the first and second members that is fixed to the brake shaft may be a sheave. Each actuator cable is secured to the circumference of a respective one of the first members, and extends in a circumferential groove on that first member. The brake cable is secured to the circumference of the second member, and extends in a circumferential groove on the second member.

The first and second brakes of the brake means may have a cantilever construction.

BRIEF DESCRIPTION OF THE DRAWINGS

An embodiment of the invention will now be described, by way of example, with reference to the accompanying drawings, wherein.

DETAILED DESCRIPTION OF THE INVENTION

Figure 1:
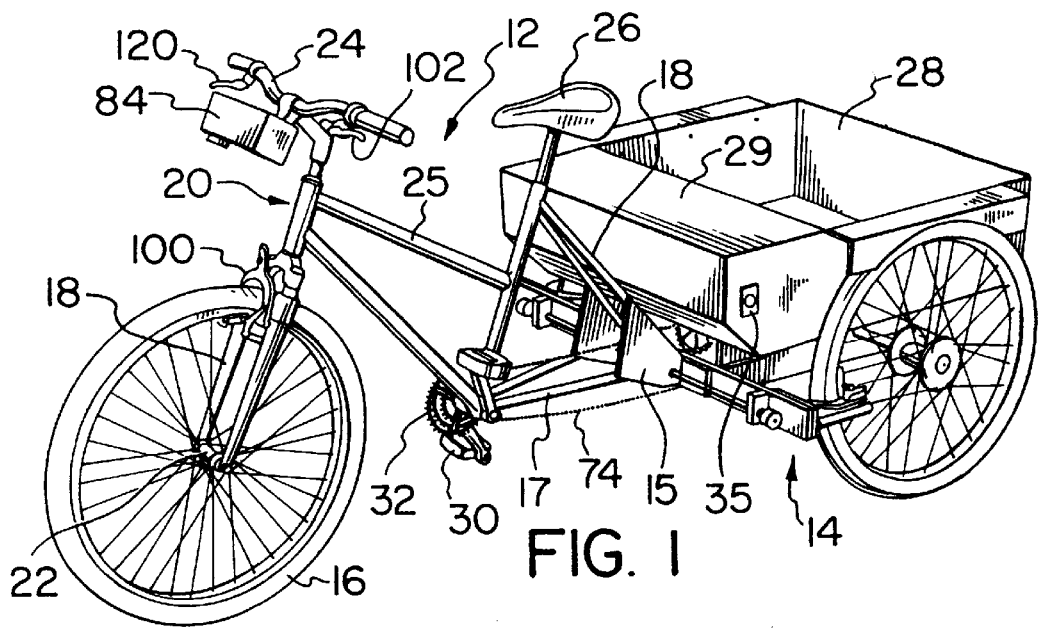
FIG. 1 is a perspective view of a tricycle according to the invention.

FIG. 1 shows a motor-assisted pedal vehicle of the invention in the form of a tricycle. Referring to FIG. 1, the tricycle has front and rear frame portions generally denoted by reference numerals 12 and 14, respectively. The front frame portion 12 is essentially that of a typical bicycle, such as a mountain bicycle. The front frame portion may be custom-made, or the rear frame portion 14 may be adapted to be rigidly fixed to the frame of a commercially-available bicycle. Accordingly, the front frame portion 12 has a front wheel 16 attached thereto via a fork 18, a suitable steering mechanism generally indicated by reference numeral 20, and a handle bar 24. A hub 22 defines the rotational axis of the wheel 16 and provides the means by which the wheel 16 is rotationally attached to the fork 18. The steering mechanism 20 permits the front wheel 16 to pivot with respect to the frame 12, 14 about a substantially vertical axis. A crossbar 25 of the frame 12 may be angled downward toward the rear of the tricycle, as shown in FIG. 1, or the crossbar 25 may be substantially horizontal. The former configuration is preferred because it affords the user easier mounting and dismounting the tricycle. A seat 26 and a pair of pedals 30 associated with one or more chainrings 32 are also disposed on the front frame portion 12.

The rear frame portion 14 lies in a plane substantially perpendicular to that of the front frame portion 12. The rear frame portion 14 is fixedly attached to the front frame portion 12 by welding or other suitable means. In the embodiment shown in FIG. 1, plates 15 are welded to the rear fork 17 and chainstay 18 of the frame 12.

Attached to the rear frame portion 14 is a cargo hold 28 having a compartment 29 for storing one or more batteries and related circuitry (not shown). One of the panels forming the compartment 29, such as the top panel, may be hinged or removable, to permit access to the batteries and circuitry. It is preferable that a locking mechanism be associated with such a panel for securing the batteries and circuitry. The compartment 29 may also house a discrete battery charger, or charging circuitry, for charging the batteries when the tricycle is not in use. In this case a connector 35 may be provided in side of the compartment 29, to conveniently permit a suitable power cable to be connected with the charging circuitry.

The cargo hold 28 may be of any shape and size, and may optionally be provided with a cover, such as a hard cover made of material the same as or different from the hold 28, in which case the cover may be attached via hinges or other suitable fasteners. Alternatively, a soft cover such as a nylon™ cover may be provided, in which case snaps, velcro™, or other suitable fasteners may be employed. The cargo hold may be provided with a seat or seats, either permanent or removable, for accommodating passengers. Further, the cargo hold 28 may be provided with tie-down points, such as holes, hooks, and rings, for securing cargo thereto and for securing child/baby seats thereto. In the case where the cargo hold 28 is equipped to carry passengers, a suitable frame and cover may be removably installed thereon to protect the passengers from sun and rain.

Figure 2:
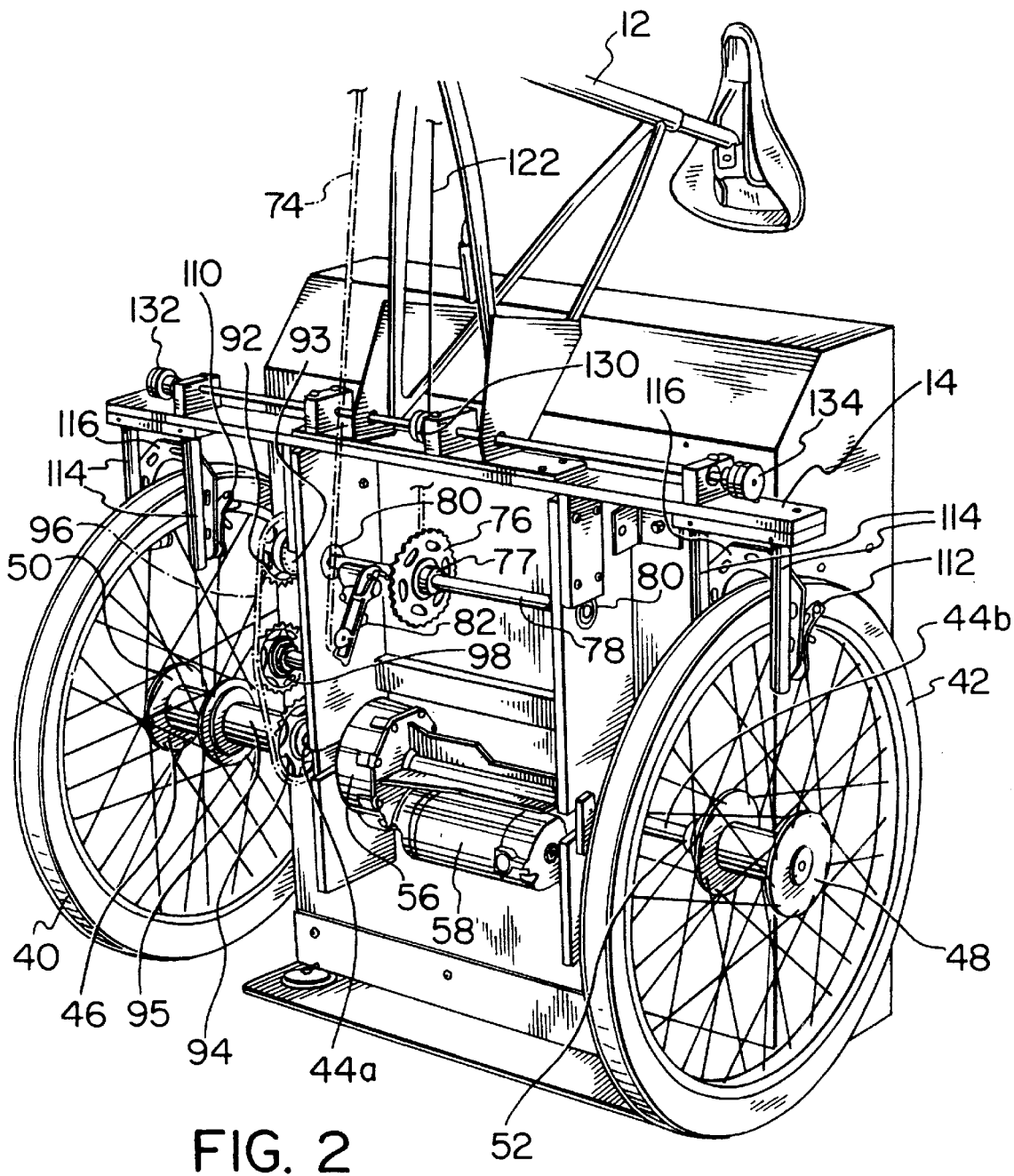
FIG. 2 is a perspective view of the drive mechanism of the tricycle shown in FIG. 1.
Figure 3:
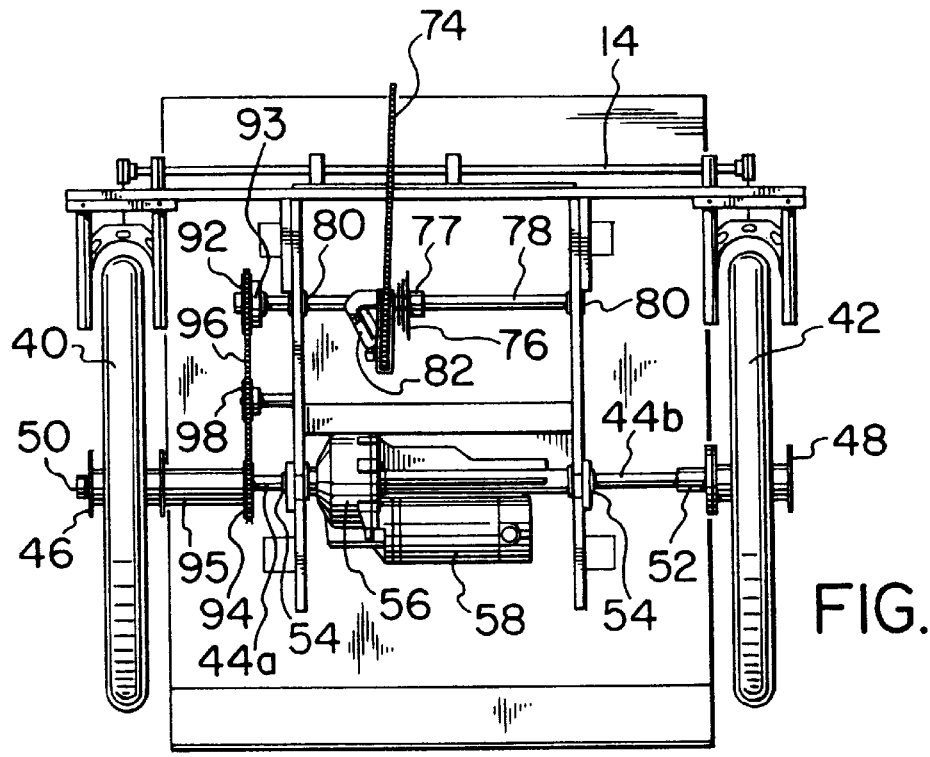
FIG. 3 is a simplified plan view of the drive mechanism shown in FIG. 2.

As shown in FIGS. 2 and 3, rear wheels 40, 42, which include hubs 46, 48, are attached to axially-aligned rear axles 44a, 44b. Hubs 46, 48 define the rotational axes of the rear wheels 40, 42. In addition, overriding clutches 50, 52 are disposed between the hubs 46, 48 and the rear axles 44a, 44b, respectively. The overriding clutches 50, 52 are unidirectional, and are disposed on the same side of respective wheels 40, 42; clutch 50 is on the outside of wheel 40, and clutch 52 is on the inside of wheel 42. The overriding clutches allow the wheels 40, 42 to rotate about their respective axes independent of the axles 44a, 44b.

Axles 44a, 44b are attached to the rear frame portion 14 via bearings 54, and are each connected to a respective opposite end of a differential 56. Instead of the axles 44a, 44b being attached to the frame 14 via suitable bearings, the housing of the differential 56 could be attached to the frame 14, in which case no additional bearings would be required for the axles 44a, 44b. The differential 56 permits the axles 44a, 44b to rotate independently of one another. An electric motor 58 connected to the differential 56 provides power to the axles 44a, 44b, and hence to the rear wheels 40, 42.

Figure 4:
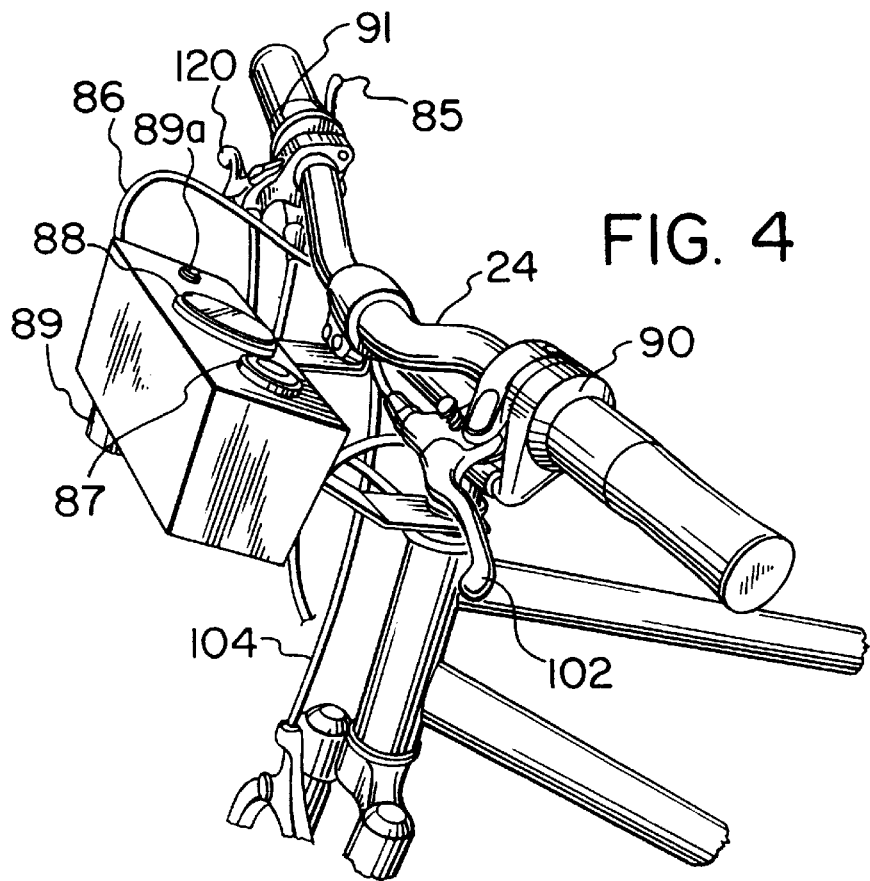
FIG. 4 is a view of the handlebar of the tricycle shown in FIG. 1.

The motor 58 receives power via wiring (not shown) from the batteries through control circuitry mounted in a suitable enclosure 84 on the handlebar 24 (see FIGS. 1 and 4). The control circuitry provides simple on-off and speed control of the motor, using techniques that are well-known in the art. A control lever 85 is mounted on the right side of the handlebar 24 to control voltage across the motor 58. The lever 85 actuates a spring-loaded cable within sheave 86, and that cable moves an arm on a potentiometer housed within enclosure 84. Releasing lever 85 results in a spring moving the potentiometer arm so that current flow to motor 58 ceases. The control circuitry includes a key-operated ignition switch 87 for the motor 58, a display 88 indicating the battery charge state, the battery current drain during use, and the ignition on/off state (by an indicator light), and a horn 89 activate by a pushbutton switch 89a. These devices are mounted on a front panel of the enclosure 84, where they are readily visible to the user. In addition, the tricycle may be provided with any combination of head lights and tail lights, connected to the batteries. In this case one or more switches for turning the lights on and off could also be disposed on the front panel of enclosure 84.

As stated above, one or more chainrings 32 may be associated with the pedals 30. Preferably, more than one chainring is provided, in which case a suitable front derailleur (not shown) is mounted on the front frame portion 12 to facilitate movement of the chain from one chainring to another, as is well-known in the art. A control mechanism for the front derailleur, in the form of twist-grip 90, is mounted on the handlebar 24 of the tricycle.

A chain 74 meshes with the chainrings 32 and at least one sprocket 76, the latter being attached to a short rear axle 78 (shown in FIG. 2). Preferably, a plurality of sprockets of different sizes are provided, arranged concentrically on a cassette or freewheel, as is well-known in the art. The sprockets 76 may be attached to the axle 78 directly, or optionally via an overriding clutch 77. The rear axle 78 is substantially parallel to the axially-aligned axles 44a, 44b, and is mounted on the frame 14 via suitable bearings 80. A rear derailleur 82 is mounted on the frame 14 to facilitate movement of the chain 74 from one sprocket to another sprocket within the plurality of sprockets 76. A rear derailleur control mechanism, in the form of a twist-grip 91, is mounted on the handlebar of the tricycle (see FIG. 4).

It will be appreciated that if the chainrings 32 and/or sprockets 76 consist of only a single chainring and a single sprocket, the corresponding derailleurs and their control mechanisms, are not required. However, the provision of a plurality of both chainrings and sprockets is desirable, because it results in a tricycle which is better suited to locomotion using pedal power than a tricycle employing only a single chainring and sprocket, owing to the different gear ratios that can be achieved with such a configuration.

A single sprocket 92 is mounted at one end of the axle 78 via an overriding clutch 93, and a second single sprocket 94 is fixed to the hub of wheel 40 via a hub extension 95. A chain 96 is meshed with the two sprockets 92, 94, and also with an optional third sprocket 98 which acts as a chain tensioner. With this arrangement, pedal power can be transferred to the wheel 40, and when pedal power is not being used to propel the tricycle, such as when the tricycle is under motor power, overriding clutch 93 permits the wheel 40, sprockets 92, 94, and 98, and chain 96 to spin independently of the axle 78 and the balance of the pedal mechanism. In this embodiment, sprocket 94 has twice as many gear teeth (32 teeth) as sprocket 92 (16 teeth) so as to increase the pedal torque on rear wheel 40 when the tricycle is going uphill.

When using pedal power to propel the tricycle, rotation of the pedals 30 and hence chainrings 32 in a forward direction causes the chain 74 and the sprockets 76 to rotate. This engages the optional overriding clutch 77, resulting in rotation of the axle 78, which engages the overriding clutch 93 and hence sprocket 92. Power is thus transferred to the wheel 40 via the chain 96 and sprocket 94 fixed thereto. Because the wheels 40, 42 are free of the differential 56, by virtue of the overriding clutches 50, 52, pedalling is efficient.

When the tricycle is in motion and the rider stops pedalling, i.e. when coasting, the overriding clutch 52 permits wheel 42 to rotate independently of its axle 44b. Similarly, the overriding clutch 50 permits wheel 40 to rotate independently of its axle 44a. Because sprocket 94 is fixed to wheel 40, sprocket 94, chain 96, and sprocket 92 are driven by the wheel 40 during coasting. However, overriding clutch 93 disengages sprocket 92 from axle 78, and the rest of the pedal mechanism is thus disengaged during coasting. Coasting is therefore efficient as virtually all of the drive mechanism is freed from the wheels.

At any point during coasting or pedalling the motor 58 may be used. When the motor 58 is activated by pressing lever 85, power is delivered to the axles 44a, 44b via the differential 56. If the wheels 40, 42 are rotating faster than that which the motor 58 can deliver, i.e. faster than the axles 44a, 44b are rotating, the motor 58 will remain essentially disconnected from the wheels 40, 42 owing to the overriding clutches 50, 52. However, if the vehicle slows while the axles 44a, 44b are rotating under motor power, the overriding clutches 50, 52 will eventually engage, bringing the vehicle under motor power.

Under motor power and when the pedals 30 are not being used, only the chain 96 and sprockets 92, 94, 98 are driven by the wheel 40, as discussed above for the situation when the tricycle is coasting. The pedals 30 may be rotated lightly, and so long as the rotating speed of the axle 78 is slower than the rotating speed at which the sprocket 92 is bring driven by the wheel 40, the pedals will essentially be disconnected from the wheel 40 by virtue of the overriding clutch 93. If, for instance, the rider increases pedalling speed such that the rotating speed of axle 78 equals that of sprocket 92, the overriding clutch 93 will become engaged, and pedal power and motor power will simultaneously propel the vehicle. If pedalling speed were to increase substantially so as to drive the vehicle faster than that which could be attained under motor power, the axles 44a, 44b and hence the motor would be freed from the wheels 40, 42, owing to the overriding clutches 50, 52, as discussed above. Thus, a motor-assisted pedal vehicle according to the invention provides for efficient use of either pedal or motor power, or a combination thereof.

The tricycle is also provided with brakes. In the embodiment shown in the figures cantilever brakes are provided. However, any other type of brakes, such as calliper, disc, or drum brakes may also be used. As shown in FIG. 1, the front cantilever brake 100 is attached to the front fork 18 in a manner well known in the art. An actuating lever 102 is disposed on the handlebar 24 and connected to the brake 100 via a cable 104 (see FIG. 4).

Cantilever brakes 110, 112 are also provided for the rear wheels 40, 42, and are suitably mounted on a portion of the frame 14 adjacent to both sides of each rear wheel. Specifically, as shown in FIG. 2 and in greater detail in FIG. 5, an extension 114 of the frame 14 is provided at each side of each rear wheel, and the cantilever brakes 110, 112 are mounted thereto in a manner well known in the art. In addition, stabilizers 116 are provided for each cantilever brake 110, 112, to resist flexing of the extensions 114 towards each other when the brakes are applied.

Figure 5:
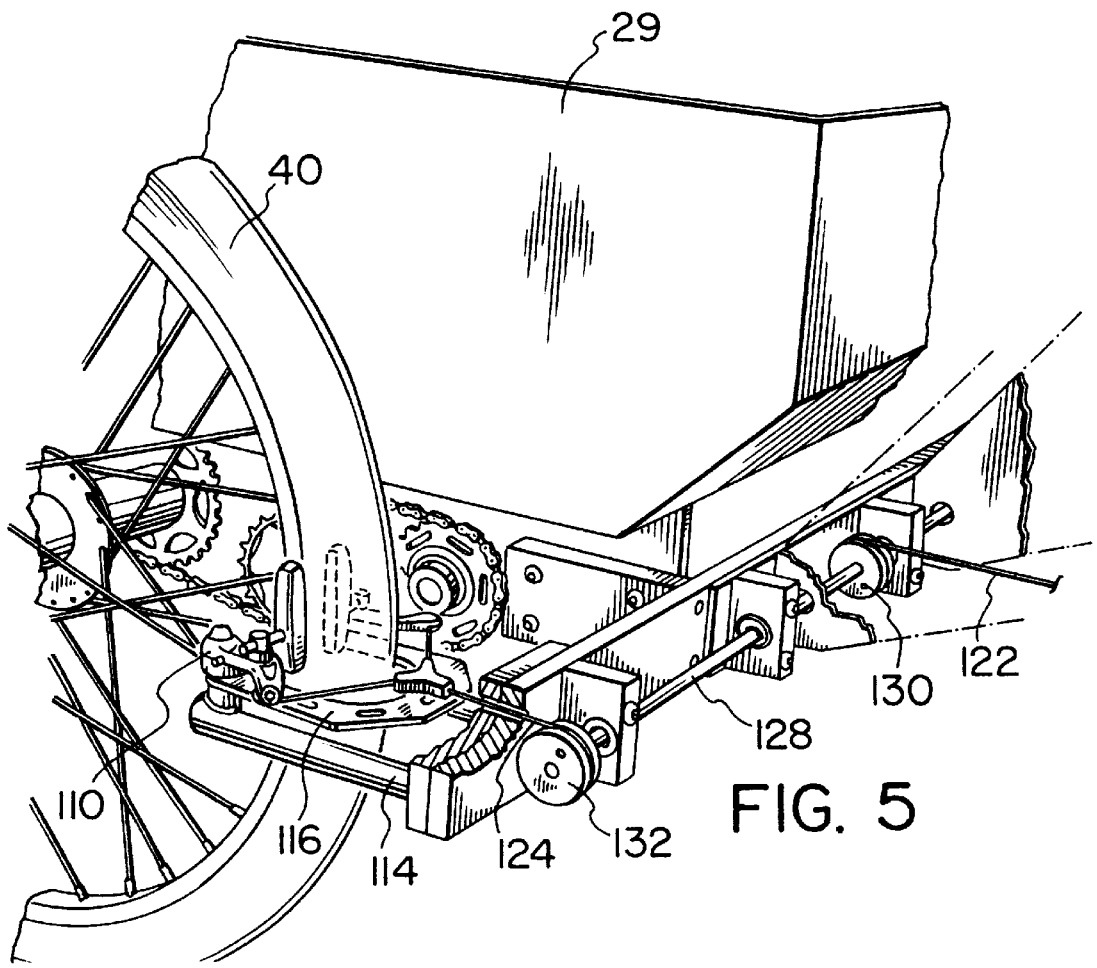
FIG. 5 (on the same page as FIG. 1) is a detailed perspective view of a portion of the rear braking mechanism of the tricycle.

The rear brakes 110, 112 are cable-actuated. Actuation of the rear brakes 110, 112 via a single actuating lever 120 mounted on the handlebar 24 (FIGS. 1 and 4) requires that tension developed in a single cable 122 connected to the lever 120 be transferred to two cables, each associated with one of the cantilever brakes 110, 112. One such cable 124 attached to the brake 110 is shown in FIG. 5. To achieve the transfer of tension from the single cable 122 to the two cables, a rod 128 spanning substantially the width of the frame 14 is mounted to the frame 14 just ahead of the brakes 110, 112. The rod 128 is mounted for rotation about a longitudinal axis thereof, via bearings, bushings, or other suitable means. A sheave 130 is mounted on the rod 128 and is adapted to receive an end of the cable 122, the other end of the cable 122 being connected to the lever 120. Sheaves 132, 134 are disposed at each end of the rod 128, and are similarly adapted to receive the two cables associated with the two cantilever brakes 110, 112. Moreover, the two cables are attached to their respective sheaves 132, 134 in a counter-rotational direction to that in which the cable 122 is attached to its sheave 130. With this arrangement, activation of the lever 120 advances cable 122, such that the cable 122 unrolls from the sheave 130 as the rod 128 rotates about its longitudinal axis, and simultaneously the two brake cables roll onto their respective sheaves 132, 134. Accordingly, tension is transferred from the cable 122 to the other two cables, and the brakes 110, 112 are activated.

It will be obvious to persons skilled in the art that other embodiments of the invention are possible. For example, with reference to FIG. 2, a simplified version of the drive arrangement of the tricycle may be constructed by eliminating the short rear axle 78. In this case the sprocket 76, which may comprise a plurality of sprockets 76, would be mounted on the rear axle 44a via the overriding clutch 77. It would be necessary in such an embodiment to position the differential 56 and motor 58 closer to the rear wheel 42, so as to accommodate the sprockets 76 on the axle 44a in such a manner that it would remain suitably aligned with the chainrings 32.

I claim:

1. A motor-assisted vehicle comprising:
   a frame;
   first wheel means rotationally disposed at one end of the frame and mounted for pivotal movement with respect to the frame;
   second wheel means rotationally disposed at a second end of the frame opposite to said first end;
   wherein the second wheel means comprises first and second wheels in a parallel spaced arrangement such that they have a substantially common rotational axis defined by corresponding first and second axially-aligned axles;
   first and second overriding clutches disposed respectively on said first and second axially aligned axles for operatively connecting said axles respectively to said first and second wheels to facilitate each of said first and second wheels rotating independently of said respective first and second axially-aligned axles;
   a differential for connecting the two axially-aligned axles so as to allow the first and second wheels to rotate independently of one another;
   a motor for supplying motor power to the second wheel means via the differential; and,
   motor control means for controlling the motor;
   wherein the first and second wheels may rotate in a forward direction independently of the differential and the motor when the motor is not in use, or when the vehicle is travelling at a speed faster than that which can be attained under power of the motor.

2. A vehicle according to claim 1, further comprising a seat mounted on the frame between the first and second wheel means.

3. A vehicle according to claim 1, further comprising brake means associated with the second wheel means for slowing and stopping the vehicle.

4. A vehicle according to claim 3, wherein the brake means comprises:
   first and second brakes each mounted on the frame adjacent a rim of a respective one of the wheels of the second wheel means, each brake having a pair of hinged arms and an actuator cable for causing an end of each arm to move against an opposite side of the respective rim;
   a brake actuating lever for exerting a pull on a brake cable; and,
   a brake shaft rotatably mounted on the frame so as to extend generally parallel to a rotational axis of wheels of the second wheel means, the brake shaft having fixed thereto a pair of radially-extending first members and a radially-extending second member positioned intermediate of the first members, each first member being positioned adjacent to a respective one of the first and second brakes, each actuator cable being connected to an outer radial position on a respective one of the first members, and the brake cable being connected to an outer radial position on the second member;
   whereby, pressing the brake actuating lever results in rotation of the brake shaft and in the arms of the first and second brakes being pressed against the respective rims of the wheels of the second wheel means to stop the vehicle.

5. A brake means according to claim 4, wherein each of the first and second members is a sheave that is mounted on the brake shaft, wherein each actuator cable is secured to the circumference of a respective one of the first members and extends in a circumferential groove on that first member, and wherein the brake cable is secured to the circumference of the second member and extends in a circumferential groove on the second member.

6. A brake system according to claim 4, wherein the brakes have a cantilever construction.

7. A brake system according to claim 5, wherein the brakes have a cantilever construction.

8. A vehicle according to claim 1, further comprising pedal means mounted on the frame between the first and second wheel means for supplying pedal power to the first wheel, and a third overriding clutch disposed between the pedal means and said first wheel.

9. A vehicle according to claim 8, wherein the pedal means comprises:

a pair of crank arms and pedals associated with a chainring means;

sprocket means operatively connected to on the first axially-aligned axle via the third overriding clutch, the sprocket means being in alignment with the chainring means; and a chain meshed with the chainring means and the sprocket means.

10. A vehicle according to claim 8, wherein the pedal means comprises:

a pair of crank arms and pedals associated with a chainring means;

sprocket means rotationally mounted on the frame between the chainring means and the axially-aligned axles, the sprocket means being in alignment with the chainring means;

a first chain meshed with the chainring means and the sprocket means;

a first sprocket rotationally mounted on the frame via said third overriding clutch, the first sprocket having an axis of rotation coaxial with the sprocket means such that the first sprocket is driven by the sprocket means;

a second sprocket fixed to said first axle and in alignment with the first sprocket; and a second chain meshed with the first and second sprockets.

11. A vehicle according to claim 10, wherein the sprocket means, the first sprocket, and third overriding clutch are mounted on an axle which is substantially parallel to said axially-aligned axles.

12. A vehicle according to claim 9, wherein the sprocket means comprises:

a series of at least two sprockets of different size, concentrically arranged;

a derailleur mounted on the frame adjacent to the sprocket means so as to facilitate movement of the chain meshed thereon from one sprocket to another within the series of sprockets; and derailleur control means.

13. A vehicle according to claim 9, wherein the chainring means comprises:

a series of at least two chainrings of different size, concentrically arranged;

a derailleur mounted on the frame adjacent to the chainring means so as to facilitate movement of the chain meshed thereon from one chainring to another within the series of chainrings; and derailleur control means.

14. A vehicle according to claim 10, wherein the sprocket means is mounted on the frame via a fourth overriding clutch.

15. A vehicle according to claim 1, wherein said first and second overriding clutches are disposed on said first and second axially-aligned axles on the same side of said first and second wheels.

16. A vehicle according to claim 15, wherein said first overriding clutch is on the outside of said first wheel and said second overriding clutch is on the inside of said second wheel.

* * * * *